United States Patent
Krishnamurthy et al.

(10) Patent No.: US 7,039,014 B1
(45) Date of Patent: May 2, 2006

(54) NETWORK-WIDE CONNECTION-BASED DEBUG MECHANISM

(75) Inventors: Chandrasekar Krishnamurthy, Sunnyvale, CA (US); Huaqing Zeng, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 773 days.

(21) Appl. No.: 09/749,178

(22) Filed: Dec. 26, 2000

(51) Int. Cl.
*H04L 12/26* (2006.01)
*G01R 31/08* (2006.01)

(52) U.S. Cl. .................... 370/244; 370/249

(58) Field of Classification Search ........ 370/242–245, 370/248–251, 342, 392, 216–218, 235, 252, 370/352, 401, 463, 506, 395.21, 389, 476; 709/231, 200, 223, 230; 714/2, 4, 6, 15; 712/10; 713/400
See application file for complete search history.

(56) References Cited

U.S. PATENT DOCUMENTS

| | | | | |
|---|---|---|---|---|
| 4,679,186 A | * | 7/1987 | Lea ............................ | 370/218 |
| 5,056,085 A | * | 10/1991 | Vu ............................. | 370/400 |
| 5,271,000 A | * | 12/1993 | Engbersen et al. ......... | 370/244 |
| 5,506,838 A | * | 4/1996 | Flanagan ................... | 370/258 |
| 5,781,529 A | * | 7/1998 | Liang et al. ................ | 370/218 |
| 5,943,391 A | * | 8/1999 | Nordling ................... | 379/1.03 |
| 5,946,316 A | * | 8/1999 | Chen et al. ................. | 370/408 |
| 6,055,561 A | * | 4/2000 | Feldman et al. ............ | 709/200 |
| 6,147,965 A | * | 11/2000 | Burns et al. ................ | 370/216 |
| 6,147,971 A | * | 11/2000 | Rochberger et al. ........ | 370/238 |
| 6,208,623 B1 | * | 3/2001 | Rochberger et al. ........ | 370/254 |
| 6,243,384 B1 | * | 6/2001 | Eriksson et al. ....... | 370/395.31 |
| 6,282,195 B1 | * | 8/2001 | Miller et al. ................ | 370/392 |
| 6,292,463 B1 | * | 9/2001 | Burns et al. ................ | 370/216 |
| 6,456,600 B1 | * | 9/2002 | Rochberger et al. ........ | 370/255 |
| 6,473,408 B1 | * | 10/2002 | Rochberger et al. ........ | 370/255 |
| 6,532,237 B1 | * | 3/2003 | Or et al. ..................... | 370/396 |
| 6,708,291 B1 | * | 3/2004 | Kidder ........................ | 714/39 |
| 6,754,219 B1 | * | 6/2004 | Cain et al. .................. | 370/401 |
| 6,757,289 B1 | * | 6/2004 | Cain et al. .................. | 370/401 |

* cited by examiner

*Primary Examiner*—Brian Nguyen
(74) *Attorney, Agent, or Firm*—Blakely, Sokoloff, Taylor & Zafman LLP

(57) ABSTRACT

An improved mechanism for analysing connection establishment/teardown process or identifying failure points (i.e. nodes) in a PNNI network through the use of a novel debug IE (information element) that is propagated along the communication path for a given connection to activate diagnostic functions on targeted switching devices. The mechanism comprises a method that is initiated by embedding a debug information element (IE) in a data packet that is propagated to various switching devices (the nodes) along the communication path. The debug IE is encoded such that it will be recognized by selected switching devices along the path, but ignored by other non-selected switching devices. Further encoding identifies targeted switching devices that are suspected to be possible failure points to confirm that they are functioning properly. Upon receipt and extraction of the debug IE from the data packet, the targeted switching devices are instructed to automatically perform one or more analysis functions to verify their operation. The results of these tests are then forwarded to an operator of the targeted switching devices, such as a network operator or a vendor that supplies the targeted switching devices to the network.

28 Claims, 9 Drawing Sheets

GFC = GENERIC FLOW CONTROL
VPI = VIRTUAL PATH IDENTIFIER
VCI = VIRTUAL CHANNEL IDENTIFIER
PT = PAYLOAD TYPE
CLP = CELL LOSS PRIORITY
HEC = HEADER ERROR CHECK

NETWORK-WIDE CONNECTION-BASED DEBUG MECHANISM

FIELD OF THE INVENTION

The present invention generally pertains to the field of Asynchronous Transfer Mode (ATM) networks and more particularly concerns a debug mechanism method for identifying failure points within the Private Network Node Interface or Private Network-to-Network Interface (PNNI) domain.

BACKGROUND OF THE INVENTION

Developed through the efforts of the ATM Forum and detailed in "The ATM Forum Technical Committee, Private Network-Network Interface Specification Version 1.0 (PNNI 1.0)," af-pnni-0055.000, Mar. 1996, PNNI 1.0 is a protocol standard that enables the building of multi-vendor, interoperable ATM switching networks. The protocol allows for the building and maintenance of large ATM networks because it provides hierarchical, dynamic link-state routing instructions and communication pathways. The protocol permits separate ATM switches within interconnecting networks to continuously communicate and share information. In addition, PNNI defines signaling requests for establishing and taking down point-to-point and point-to-multipoint connections across those networks.

PNNI routing is based on well-known, link-state routing techniques similar to, for example, Open Shortest Path First (OSPF). In addition to the basic link-state mechanism, PNNI provides support for quality of service (QoS) routing, required for applications with real-time requirements and scalability to large global networks. These features provide large-scale networks with a single routing protocol, unlike the Internet strategy of using a number of protocols at various levels.

To establish connections, PNNI environments operate with peer groups (PG), a collection of logical nodes that exchange information with other members of the group. This information exchange allows all members of the same peer group to maintain an identical view of the PG and for those nodes outside of the PG to exchange messages with the PG as a whole. In more detail, connections in PNNI networks are enabled through dynamic routing, which requires that each node exchange information (link state information) with other nodes in its peer group regarding the connection topology (links) between itself and the other peer nodes, as well as exchanging less-detailed information regarding the connection topology of nodes outside the peer group. This information exchange is done on a regular basis in order to keep the status of the links in the network updated. When a call setup request is received at an originating node, the originating node utilizes the information it has received in order to generate a stack of "Designated Transit Lists" (DTLs) for the routing of the call setup request through the network hierarchy. A DTL essentially comprises a string of node identifications that is sent in conjunction with the call setup request.

One of the difficulties with dynamic routing schemes is that it greatly complicates identification of failure points in the network. Failure points are also referred to as rejection points. Since the route for a particular connection cannot be predicted beforehand, it typically is necessary to use a trace mechanism to determine the actual route used. Although path and connection trace mechanism can identify the route being taken, it cannot be effectively used for troubleshooting, because the number of connection setup messages will overload the network due to the sheer size of the TTL (time to live) IE (information element).

SUMMARY OF THE INVENTION

An improved mechanism is described for identifying failure points (i.e. nodes) in a PNNI network through the use of a debug IE (information element) that is propagated along the communication path for a given connection to activate diagnostic functions on targeted switching devices. The mechanism comprises a method that is initiated by embedding a debug information element (IE) in a data packet, such as a communications management message, which is propagated to various switching devices (the nodes) along the communication path. The debug IE is encoded such that it will be recognized by selected switching devices along the path, but ignored by other non-selected switching devices. Further encoding identifies targeted switching devices that are suspected to be possible failure points to confirm that they are functioning properly and/or diagnose why they have failed. This can also be used for any diagnostic functions that need to be performed in the switching device. Upon receipt and extraction of the debug IE from the data packet, the targeted switching devices are instructed to automatically perform one or more failure analysis functions to verify their operation. The results of these tests are then forwarded to an operator of the targeted switching devices, such as a network operator or a vendor that supplies the targeted switching devices to the network. Also, the debug IE can be used for any diagnostic information and also collecting runtime data on a per connection basis even though the connection can be established successfully.

Other features and advantages of the present invention will be apparent from the accompanying drawings and from the detailed description that follows below.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

An improved mechanism is disclosed for identifying failure points (i.e. nodes) in a PNNI network through the use of a novel debug IE (information element) that is propagated along the communication path for a given connection. In order to better understand the features and advantages provided by embodiments of the invention, a discussion of the hierarchical structure and basic operations of a PNNI network is now presented.

Figure 1:
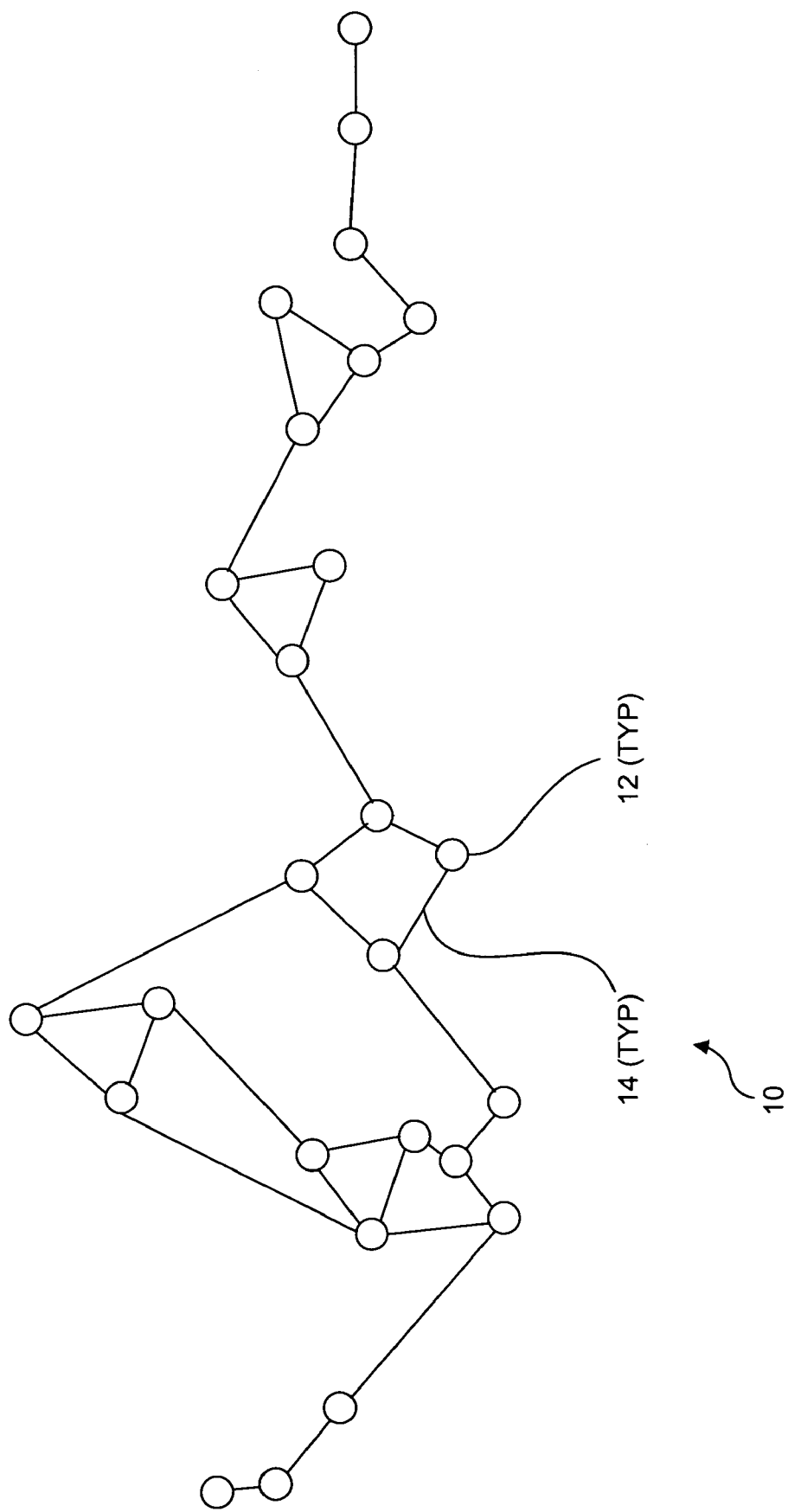
FIG. 1 is a schematic diagram illustrating an typical ATM switching network comprising a plurality of switching devices (i.e., nodes)

From a physical standpoint, a PNNI network comprises a plurality of switching devices, refered to as "nodes," which are interconnected by means of physical links, i.e., through fiber optic or wired connections. The PNNI specification enables the connection and interaction of various vendor-independent switching devices, provided by companies such as Cisco Systems, Nortel Networks, and Lucent Technologies. An exemplary PNNI network 10 is shown in FIG. 1, comprising 26 nodes 12 interconnected by a plurality of physical links 14. In the context of FIG. 1, nodes 12 comprise the lowest level nodes of the PNNI hierachy. Data passes through the lowest-level nodes to other lowest level nodes and to end systems, which are points of origin and termination of connections. In PNNI routing, a connection between end systems (not shown in FIG. 1) typically is formed by connecting a plurality of substantially adjacent nodes along a continuous path, although the connection path may be routed between any set of nodes in the network.

A port is the attachment point of a link to a lowest-level node within a switching system. Physical links are duplex (i.e., communications data may be carried in either direction). However, physical link characteristics may be different in each direction, either because the capacities differ, or because existing traffic loads are different. Accordingly, each physical link is identified by two sets of parameters, one for each direction. These sets comprise a transmitting port identifier plus the node ID of the lowest-level node containing the port.

If the PNNI protocol supported only the flat network depicted in FIG. 1, then each of the lowest-level nodes would have to maintain the entire topology of the network, including information for every physical link in the network and reachability information for every node in the network. While this is feasible for small networks, it becomes intractable for larger networks. Accordingly, the PNNI specification defines a hierarchical architecture that reduces overhead requirements, while providing for efficient routing.

Figure 2:
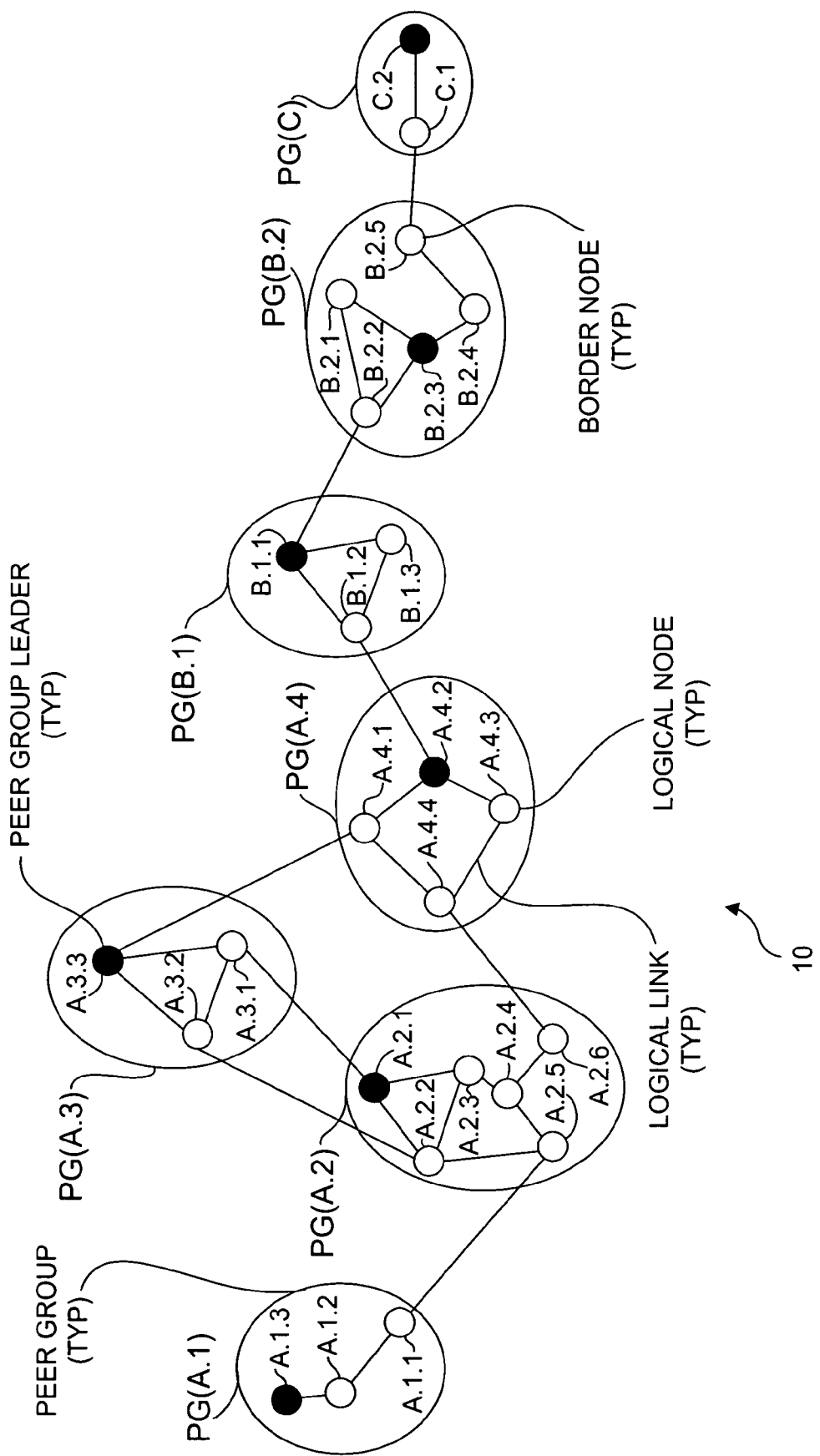
FIG. 2 depicts a first level hierarchy of an exemplary PNNI network corresponding to the ATM switching network of FIG. 1.

The PNNI hierarchy begins at the lowest level, where the lowest-level nodes are organized into peer groups. A "logical node" in the context of the lowest hierarchy level is a lowest-level node. For simplicity, logical nodes are often denoted as "nodes." A peer group (PG) is a collection of logical nodes, each of which exchanges information with other members of the group, such that all members maintain an identical view of the group. Logical nodes are uniquely and unambiguously identified by "logical node IDs." As shown in FIG. 2, PNNI Network 10 is organized into 7 peer groups: A.1, A.2, A.3, A.4, B.1, B.2, and C. To avoid later confusion between nodes and peer groups, peer groups are represented in the Figures by PG( ). For example, PG (A.3) denotes peer group A.3. The node and peer group numbering used in the Figures, such as A.3.2 and A.3, corresponds to an abstract representation of the hierarchical structure of the PNNI network architecture.

A peer group is identified by its "peer group identifier," which is specified at configuration time. Neighboring nodes exchange peer group IDs in "Hello packets." If nodes have the same peer group ID, then they belong to the same peer group. If the exchanged peer group IDs are different, then the nodes belong to different peer groups. A "border node" has at least one link that crosses the peer group boundary. Hence neighboring nodes with different peer group IDs are border nodes of their respective peer groups. In the presence of certain errors or failures, peer groups can partition, leading to the formation of multiple peer groups with the same peer group ID. The peer group ID is defined as a prefix of at most 13 octets on an ATM End System Address. Thus, the peer group ID can default to a prefix on the address(es) of one or more nodes belonging to the peer group in question, but this is not a requirement.

Logical nodes are connected by "logical links." Between lowest-level nodes, a logical link is either a physical link or a VPC (Virtual Private Connection) between two lowest-level nodes. Links between lowest-level nodes in the same peer group are not aggregated. For example if two physical links were to connect the same pair of lowest-level nodes, then they would be represented by two separate logical links. Logical links inside a peer group are "horizontal links," whereas links that connect two peer groups are referred to as "outside links."

When a logical link becomes operational, the attached nodes initiate an exchange of information via a well-known Virtual Channel Connection (VCC) as a "PNNI Routing Control Channel" (RCC). Hello packets sent periodically by each node on this link specify the ATM End System Address, node ID, and its port ID for the link. In this manner, the Hello protocol makes the two neighboring nodes known to each other. As discussed above, the PNNI Hello protocol also supports the exchange of peer group IDs so that neighboring nodes can determine whether they belong to a same peer group or to different peer groups.

Each node exchanges Hello packets with its immediate neighbors and thereby determines its local state information. This state information includes the identity and peer group membership of the node's immediate neighbors, and the status of its links to the neighbors. Each node then bundles its state information in "PNNI Topology State Elements" (PTSEs), which are reliably flooded throughout the peer group. PTSEs are the smallest collection of PNNI routing information that is flooded as a unit among all logical nodes within a peer group. A node's topology database consists of a collection of all PTSEs received, which represent that node's present view of the PNNI routing domain. In particular, the topology database provides all the information required to compute a route from the given node to any address reachable in or through that routing domain.

Every node generates a PTSE that describes its own identity and capabilities, information used to elect the peer group leader, as well as information used in establishing the PNNI hierarchy. This is referred to as the nodal information.

PTSEs contain, among other things, "topology state parameters" (i.e. "link state parameters", which describe the characteristics of logical links, and "nodal state parameters", which describe the characteristics of nodes). Topology state parameters are classified as either attributes or metrics. An attribute is considered individually when making routing decisions. For example a security "nodal attribute" could cause a given path to be refused. A metric, on the other hand, is a parameter whose effect is cumulative along a path. For example, delay "metrics" add up as one progresses along a given path. Certain topology state information, especially that related to bandwidth, is rather dynamic. On the other hand, other topology state information, such as Administrative Weight, may be relatively static. There is no distinction between dynamic and static topology state parameters in the flooding mechanism for PNNI topology distribution.

Reachability information consists of addresses and address prefixes which describe the destinations to which calls may be routed. This information is advertised in PTSEs by nodes in the PNNI routing domain. Internal and exterior reachability information is logically distinguished based on its source. PNNI routing may not be the only protocol used for routing in an ATM network. Exterior reachability is derived from other protocol exchanges outside the PNNI routing domain. Internal reachability represents local knowledge of reachability within the PNNI routing domain. The primary significance of this distinction is that exterior reachability information shall not be advertised to other routing protocols or routing domains (for fear of causing routing loops across routing domains). Manual configuration can be used to create internal or exterior reachability information with corresponding effects on what is advertised to other routing protocols or domains. Exterior reachable addresses may also be used to advertise connectivity to otherwise independent PNNI routing domains.

When neighboring nodes, at either end of a logical link being initialized, conclude that they are in the same peer group through the exchange of Hellos, they proceed to synchronize their "topology databases." Database synchronization is the exchange of information between neighbor nodes resulting in the two nodes having identical topology databases. The topology database includes detailed topology information about the peer group in which the logical node resides plus more abstract topology information representing the remainder of the PNNI routing domain. The way in which this higher level information flows into the peer group is described below.

During a topology database synchronization, the nodes in question first exchange PTSE header information, i.e. they advertise the presence of PTSEs in their respective topology database. When a node receives PTSE header information that advertises a more recent PTSE version than the one it has or advertises a PTSE that it does not yet have, it requests the advertised PTSE and updates its topology database with the subsequently received PTSE. If a newly initialized node connects to a peer group then the ensuing database synchronization reduces to a one-way topology database copy.

A link is advertised via PTSE transmissions only after the database synchronization between the respective neighboring nodes has successfully completed. In this way, the link state parameters are distributed to all topology databases in the peer group containing that link. This is achieved through "flooding."

Flooding is the reliable hop-by-hop propagation of PTSEs throughout a peer group. It ensures that each node in a peer group maintains an identical topology database. Flooding is the advertising mechanism in PNNI.

In essence, the flooding procedure is as follows. PTSEs are encapsulated within "PNNI topology state packets" (PTSPs) for transmission. When a PTSP is received, its component PTSEs are examined. Each PTSE is acknowledged by encapsulating information from its PTSE header within an "Acknowledgment Packet", which is sent back to the sending neighbor. If the PTSE is new or of more recent origin than the node's current copy, it is installed in the topology database and flooded to all neighbor nodes except the one from which the PTSE was received. A PTSE sent to a neighbor is periodically retransmitted until acknowledged.

Flooding is an ongoing activity, i.e., each node issues PTSPs with PTSEs that contain updated information. The PTSEs contained in topology databases are subject to aging and get removed after a predefined duration if they are not refreshed by new incoming PTSEs. Only the node that originally originates a particular PTSE can reoriginate that PTSE. PTSEs are reissued both periodically and on an event driven basis.

Each peer group is represented in the next hierarchical level by a single node called a "logical group node." The functions needed to perform this role are executed by a node, called the "peer group leader", that is a member of the peer group being represented. There is at most one active peer group leader (PGL) per peer group; more precisely at most one per partition in the case of a partitioned peer group. PGLs are selected through an election process, details of which are not disclosed herein. Apart from its specific role in aggregation and distribution of information for maintaining the PNNI hierarchy, the PGL does not have any special role in the peer group. For all other functions, e.g., connection establishment, it acts like any other node.

Internal operation of a peer group does not require having a peer group leader. Full connectivity within a peer group can be achieved without a peer group leader. A PNNI Routing Domain configured as a single peer group can achieve full connectivity even without a peer group leader.

A degenerate form of a peer group is one containing a single node. The peer group leader of a single node peer group is the node itself. This could occur through configuration, or as a result of failures.

Figure 3:
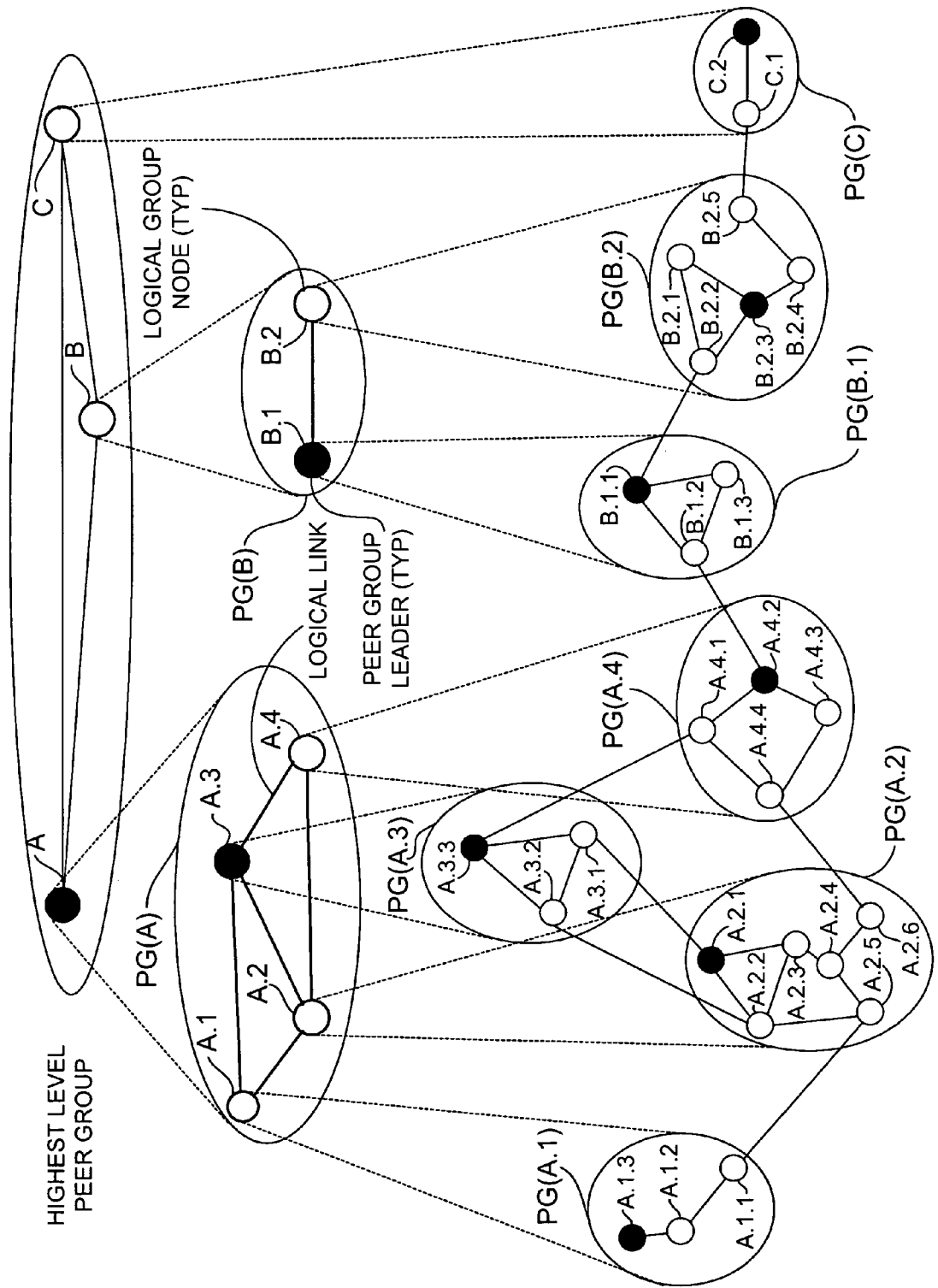
FIG. 3 depicts a second level and top level of the PNNI network hierarchy corresponding to FIGS. 1 and 2.

A "logical group node" is an abstraction of a peer group for the purpose of representing that peer group in the next PNNI routing hierarchy level. For example, in FIG. 3, logical group node A.2 represents peer group A.2 in the next higher level peer group A. FIG. 3 shows one way that the peer groups in FIG. 2 can be organized into the next level of peer group hierarchy.

The functions of the logical group node and the peer group leader of its child peer group are closely related. The functions of a logical group node include aggregating and summarizing information about its child peer group and flooding that information into its own peer group. A logical group node also passes information received from its peer group to the PGL of its child peer group for flooding. A logical group node does not participate in PNNI signaling.

A logical group node is identified by a node ID, which by default contains the peer group ID of the peer group that the node is representing. A logical group node is addressable by a unique ATM End System Address that may, for example, correspond to the address of the lowest-level node in the same switching system but with a different "selector" value.

The manner in which a peer group is represented depends on the policies and algorithms of the peer group leader. Thus given two potential peer group leaders that implement the same policies and algorithms, the representation of the peer group does not depend on which of the two is elected.

Observe that logical group nodes in FIG. 3 are organized into peer groups. For example, logical nodes A.1, A.2, A.3 and A.4 are organized into peer group A. This higher level peer group is a peer group in a manner similar to that described above, with the only difference being that each of its nodes represents a separate lower-level peer group. Consequently, peer group A has a peer group leader (logical group node A.2) chosen by the leader election process. Note the functions that define peer group leader of A are located in node A.2, which is in turn implemented on the switching system containing lowest-level node A.2.3.

Peer group A is called the "parent peer group" of peer groups A.1, A.2, A.3 and A.4. Conversely, peer groups A.1, A.2, A.3 and A.4 are called "child peer groups" of peer group A. A parent peer group is identified by a peer group ID that must be shorter in length than its child peer group IDs. Any node capable of becoming peer group leader must be configured with its parent peer group ID.

The length of a peer group ID indicates the level of that peer group within the PNNI hierarchy. One refers to this length as the "level indicator." PNNI levels are not dense, in the sense that not all levels will be used in any specific topology. For example, a peer group with an ID of length "n" bits may have a parent peer group whose ID ranges anywhere from 0 to n–1 bits in length. Similarly, a peer group with an ID of length "m" bits may have a child peer group whose identifier ranges anywhere from m+1 to 104 bits in length (104 is the maximum peer group ID length and corresponds to 13 octets).

A logical group node represents an entire underlying peer group. The associated peer group leader, as a member of the underlying peer group, has received complete topology state information from all nodes in the peer group. This provides the peer group leader with all of the required information to instantiate the logical group node. Conceptually this may be thought of as the peer group leader feeding information up to the logical group node it instantiates. This upward flow includes two types of information: reachability and topology aggregation. Reachability refers to summarized address information needed to determine which addresses can be reached through the lower level peer group. Topology aggregation refers to the summarized topology information needed to route into and across this peer group.

There is a filtering function inherent in the summarization process that propagates only the information needed by the higher levels. PTSEs never flow up the hierarchy. Instead the summarized information is advertised within PTSEs originated by the logical group node and flooded to its peers.

The foregoing describes how feeding information up the PNNI routing hierarchy is necessary for creating the hierarchy itself and for distributing routing information about child peer groups. Conversely feeding information down the hierarchy is necessary to allow nodes in the lower level peer groups to route to all destinations reachable via the PNNI routing domain. Route computation uses this information to select routes to destinations.

Each logical group node feeds information down to its underlying peer group. The information fed down consists of all PTSEs it originates or receives via flooding from other members of the LGN's peer group. Each PTSE that flows down to a peer group leader is flooded across that peer group. This gives every node in a peer group a view of the higher levels into which it is being aggregated. In summary, PTSEs flow horizontally through a peer group and downward into and through child peer groups.

Figure 4:
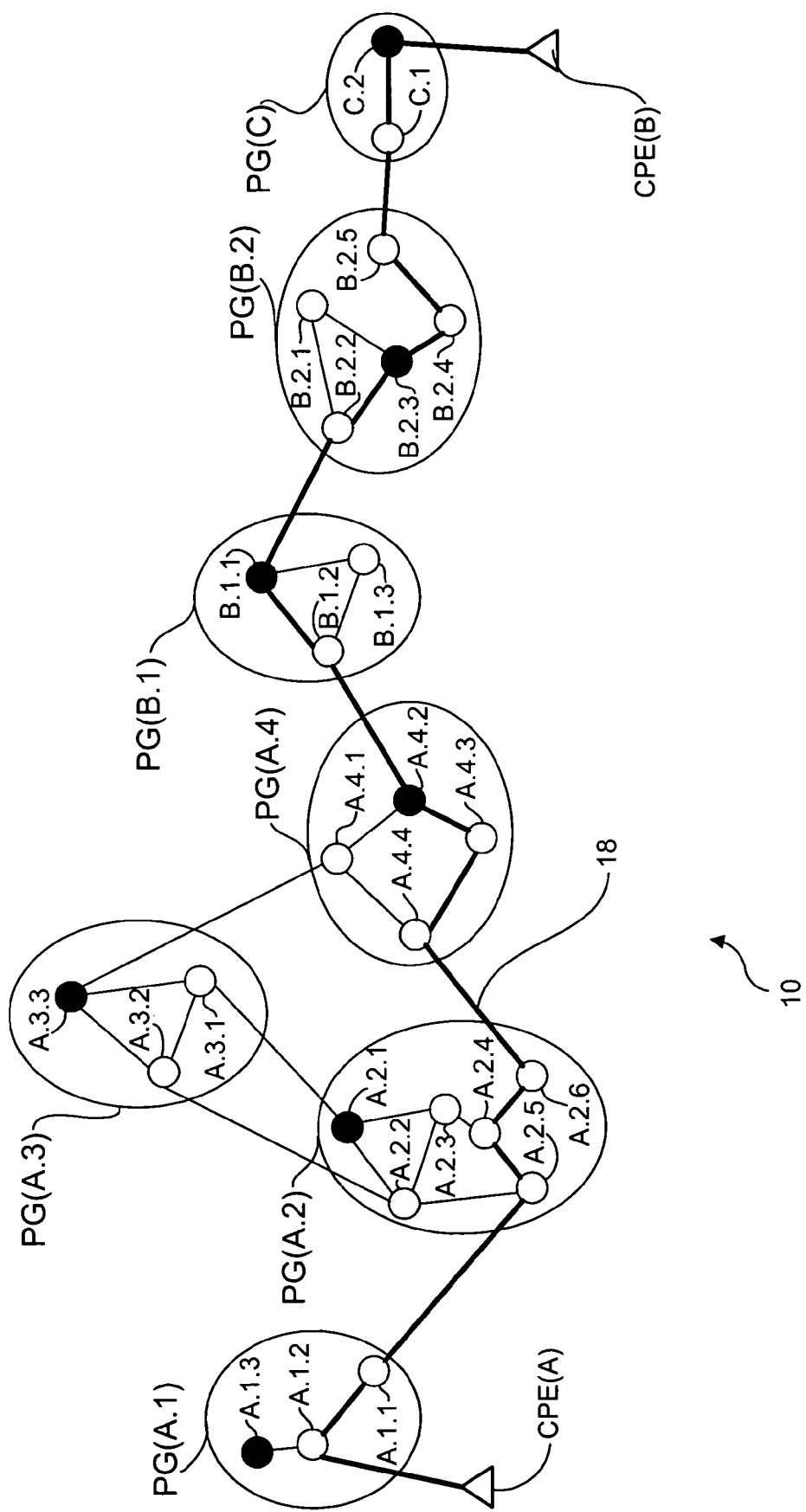
FIG. 4 depicts an exemplary communication path corresponding to a call between a pair of system end-points.

With reference to FIG. 4, a connection path 18 corresponding to an exemplary end-system-to-end-system connection is illustrated. The connection originates at a Customer Premise Equipment (CPE)(A) and terminates at CPE (B). The route of the path comprises sequentially lowest level nodes A.1.2, A.1.1, A.2.5, A.2.4, A.2.6, A.4.4, A.4.3, A.4.2, B.1.2, B.1.1, B.2.2, B.2.3, B.2.4, B.2.5, C.1, and C.2. At the next higher level in the PNNI hierachy, the path sequentially comprises nodes A.1, A.2, A.3, B.1, B., and C. It is noted that path 18 is one of many paths that may be used to connect CPE (A) to CPE (B). The actual path taken would depend on the traffic loading of the various nodes, as well as other information, and, accordingly, would be dynamically allocated.

In ATM networks, data is passed along a communication path in the form of a fixed-size unit called a "cell." ATM is a cell-switching and multiplexing technology that combines the benefits of circuit switching (guaranteed capacity and constant transmission delay) with those of packet switching (flexibility and efficiency for intermittent traffic). Depending on the type of data being sent, e.g. audio data, video data, or binary data, various Quality of Service (QoS) parameters are specified. The most commonly used QoS parameters are average cell transfer delay, cell delay variation, cell loss ratio, cell error ratio, and cell misinsertion rate. For example, since audio and video connections require real-time or near-real-time transmission, their corresponding QoS parameters will typically place emphasis on speed of transmission, i.e., the parameters for cell transfer delay and cell delay variation will be set to adhere to rapid data delivery. In these instances, the penalty for losing data (e.g., a missed cell) is not great. In contrast, binary data (e.g., a computer file) needs to be accurately transported, but generally does not require real-time transfer. Accordingly, the cell loss ratio, cell error ratio, and cell misinsertion rate parameters will be emphasized, with allowances for a corresponding penalty in speed.

Figure 5:
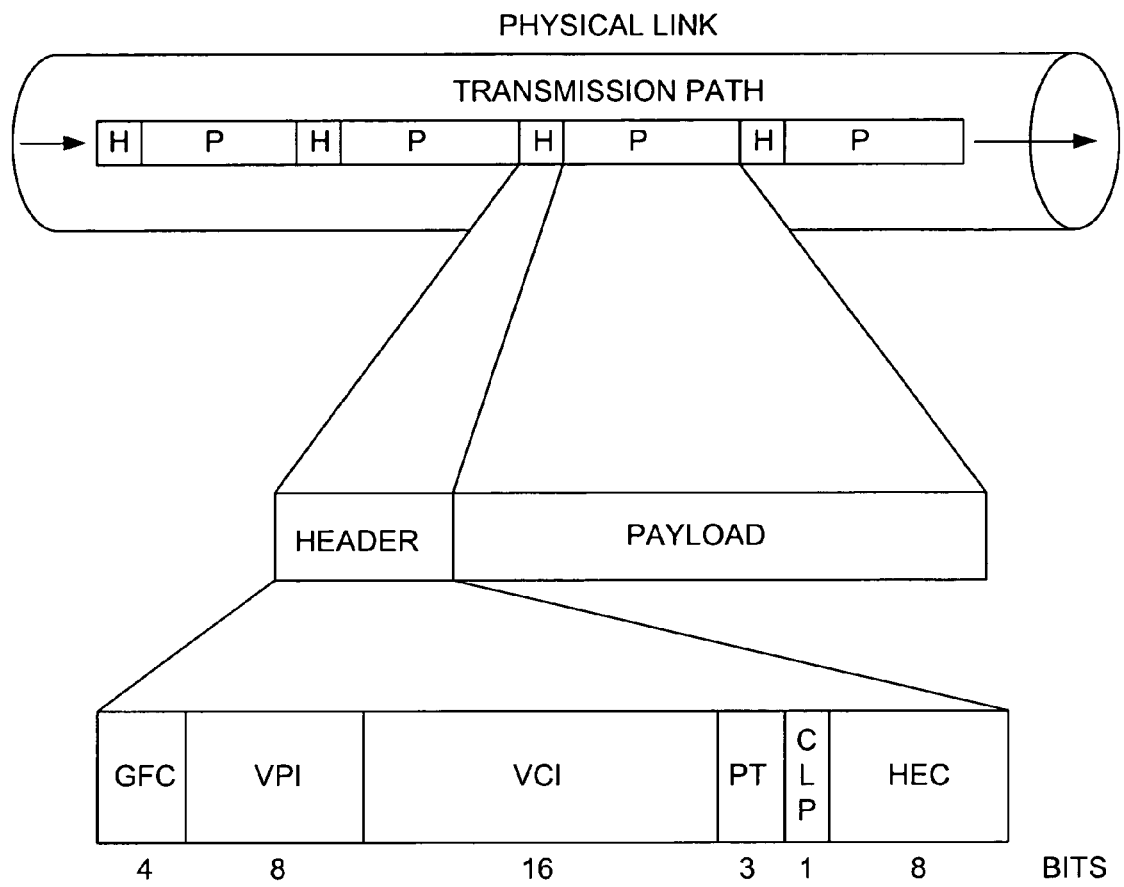
FIG. 5 is a diagram illustrating details of the header portion of ATM cell.
Figure 5:
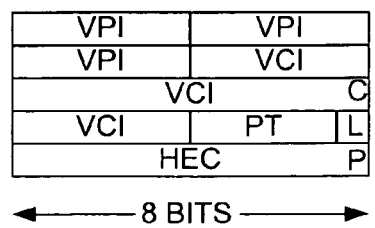

An ATM cell header can be in one of two formats: UNI or NNI. The UNI header is used for communication between ATM endpoints and ATM switches in private ATM networks. The NNI header is used for communication between ATM switches. The Header portion of an ATM cell that implements the NNI format is depicted in FIG. 5, comprising a 4-bit Generic Flow Control (GFC), an 8-bit virtual path identifier (VPI), a 16 bit virtual channel identifier (VCI), a 3-bit payload type (PT), a 1-bit cell loss priority (CLP), and an 8-bit header error check (HEC). The UNI header is substantially similar to the NNI header, except that there is no GFC, with the VPI comprising 12 instead of 8 bits.

Messages and data are propogated across the network using ATM switching. The basic operation of ATM switching is straightforward: The cell is received across a link on a known VCI or VPI value. The switch looks up the connection value in a local translation table to determine the outgoing port (or ports) of the connection and the new VPI/VCI value of the connection on that link. The switch then retransmits the cell on that outgoing link with the appropriate connection identifiers. Because all VCIs and VPIs have only local significance across a particular link, these values are remapped, as necessary, at each switch.

ATM cell streams are converted into other formats specific to various communication protocols, such as telephony protocols and IP protocols, in ATM adaptation layers (AALs), that sit above the ATM layer in a multi-layer stack. Details of the various AALs will be known to those skilled in the art, and are therefore not disclosed herein. The AALs enable transmission of data in variable-length packets, such as IP packets. In addition, various information is distributed across the network through the use of similar higher-level data packets.

Included in these data packets are connection-management messages. ATM uses several connection-management messages to initiate, acknowledge, and release connections. For example, an end-point-to-end-point connection path is established in the following manner. The calling party (i.e., the party at the initiation end point, e.g., CPE(A)) initiates a call attempt using a SETUP message indicating CPE(B) as the called party number IE. Information in the SETUP message may also include QoS parameters. The network routes the call to the physical interface on which CPE(B) is connected and outputs a SETUP message indicating the VPI/VCI to use if the call is accepted. Optionally, the SETUP message may also communicate the identity of the calling party (CPE(A)) in the calling party number IE, similar to the calling line ID service provided by telephone service providers. The route selected is a function of the network traffic ar nodes along the path (as well as the traffic at nodes that were considered, but are not used in the path), as well as QoS considerations, if specified in the SETUP message. Once the SETUP message reaches the called party, the called party may accept the call by returning a CONNECT message, which the network propagates back to the originator as rapidly as possible in order to keep the call setup time as low as possible. A CONNECT ACKNOWLEDGE message is used from the network to the called party and from the calling party to the network as the final stage of the three-way handshake to ensure that the connection is indeed active.

A end-point-to-end-point connection release (i.e., hang up a call) proceeds as follows. Either party may initiate the release process, just as either party may hngu up first during a telephone call. A connection release is initiated by sending a RELEASE message. The network then propagates the RELEASE message across the network to the other party. The other party acknowledges the RELEASE request by returning a RELEASE COMPLETE message, which is then propogated back across the network to the party that originated the RELEASE request.

Figure 6:
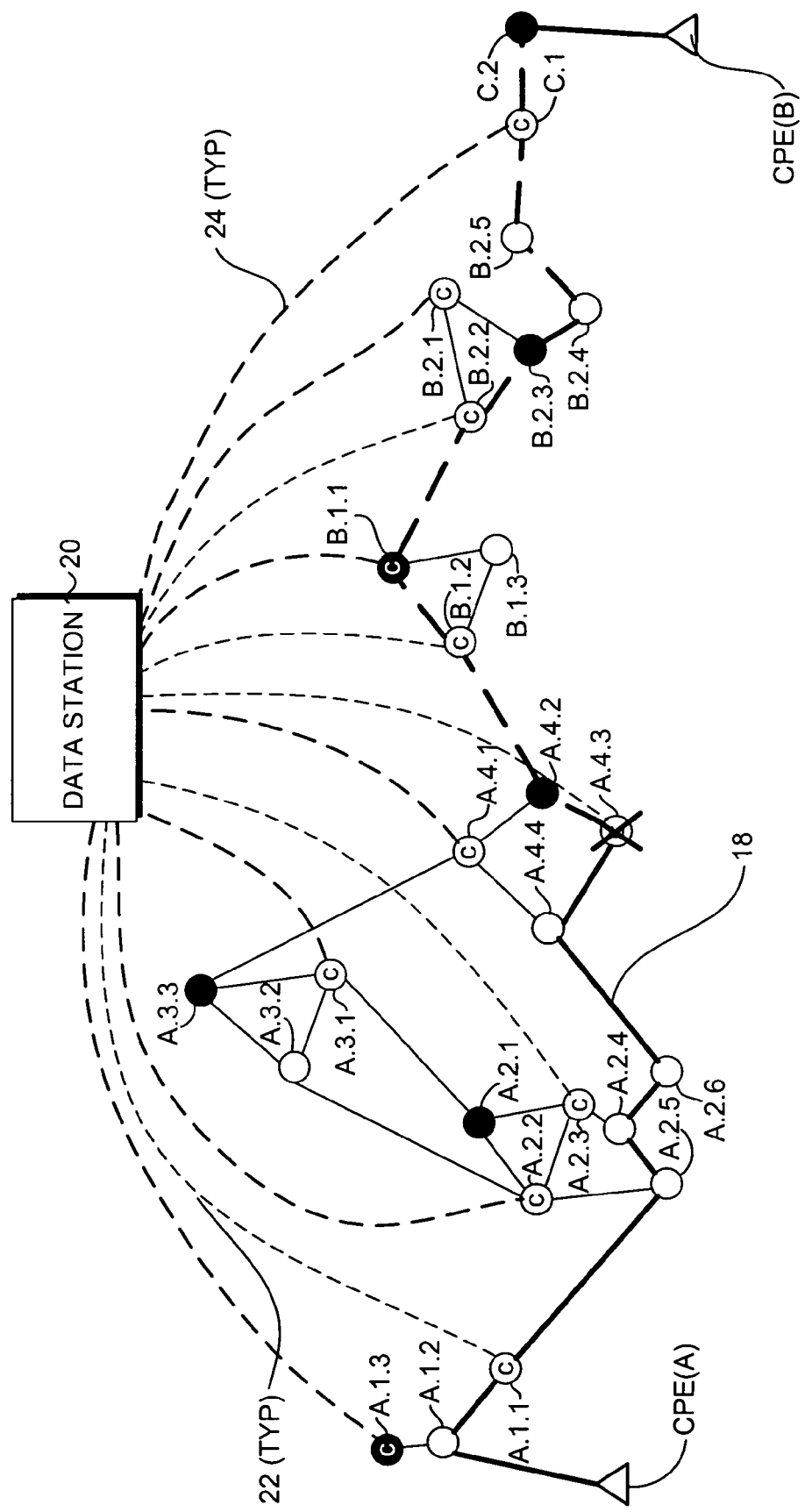
FIG. 6 is a schematic diagram illustrating an interrupted connection path and depicting an exemplary scheme for forwarding failure analysis test results to an operator of the network.

Suppose that node A.4.3 has a problem, preventing the call from going through, such as shown in FIG. 6. In accord with the PNNI specification, the network protocol is such that the call will be rerouted around the problem. However, there are no built-in provisions for identifying the problem. This need is provided by the present invention through the use of a "debug" IE that may be embedded in ATM messages corresponding to SETUP, CALL PROCEEDING, CONNECT, RELEASE, and/or RELEASE COMPLETE connection management messages, or may be implemented in other types of messages.

As discusses above, the ATM protocol supports multi-vendor networks, such that switching devices from various suppliers may be implemented in the same network. Many of these vendors supply switching devices with built in failure diagonostic functions that may be used in debugging equipment failures.

A debug mechanism is provided that enables selective activation of failure diagnostics in switching devices along a given connection path. According to one embodiment, the debug mechanism comprises embedding a debug IE in one or more connection-management messages, such as a SETUP, CALL PROCEEDING, CONNECT, RELEASE, and/or RELEASE COMPLETE message. As the debug IE is propogated along the communication path during the passing of a connection-management message, the failure diagnostic function(s) of various targeted switching devices can be selectively activated. Since ATM networks are vendor-neutral, a particular vendor may implement the debug mechanism on that vendor's equipment, in a manner that does not effect the operation of the equipment provided by other vendors.

For example, the debug IE can be embedded in a SETUP message to indicate that failure diagnostic functions should be performed on of a particular vendor's switching devices that are along a connection path. Optionally, the debug IE can be encoded such that the failure diagnostic functions are activated in those switching devices that meet a specific requirement, such as along a certain portion of the connection path, or switching devices that are members of a certain peer group.

Figure 7:
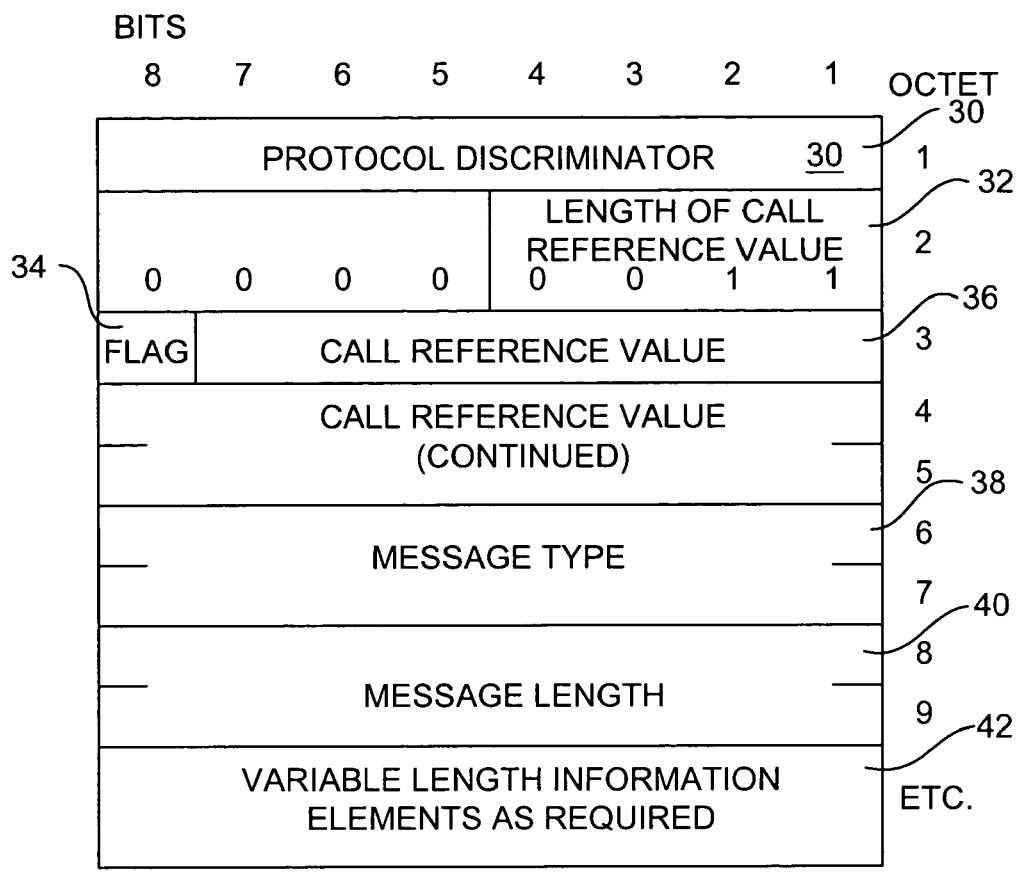
FIG. 7 shows the recommended format of a general message under the PNNI protocol.

The structure for information element coding in a general PNNI message as defined in ITU-T recommendation Q.2931 is shown in FIG. 7. As will be recognized by those skilled in the art, each message comprises a plurality of ATM cells, which is handled by the AALs. The coding format of the message is 8 bits wide, and each grouping of information (i.e., field) is generally divided into octets (the vertical coordinate in the Figure). The message format includes an 8-bit protocol discriminator 30, a 4-bit length of call reference value 32, a 1-bit flag 34, an up to 15-bit call reference value 436, a message type 38, a message length 40, and a variable length IE 42.

Figure 8:
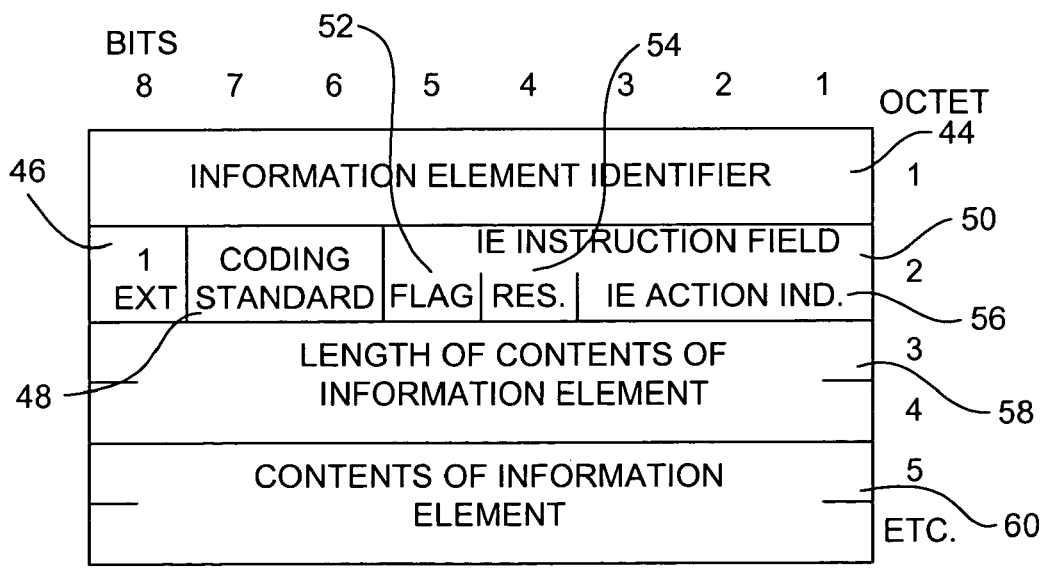
FIG. 8 shows the recommended format of a general information element under the PNNI protocol.

The formatting of a general information element as defined by standard Q.2931 is shown in FIG. 8. The format includes an 8-bit information element identifier 44, a 1-bit extension 46, a 2-bit coding standard 48, and a 5-bit IE instruction field 50 including a 1-bit flag 52, a 1-bit resource 54, an a 3-bit IE action indicator 56. The format also includes a 16-bit length of contents of the IE field 58, and provides additional space of variable length for the contents of the IE in a field 60. IE instruction field 50 is only interpreted in case of unexpected information elements, an unrecognized information element identifier, or information elements with unrecognized content.

Figure 9:
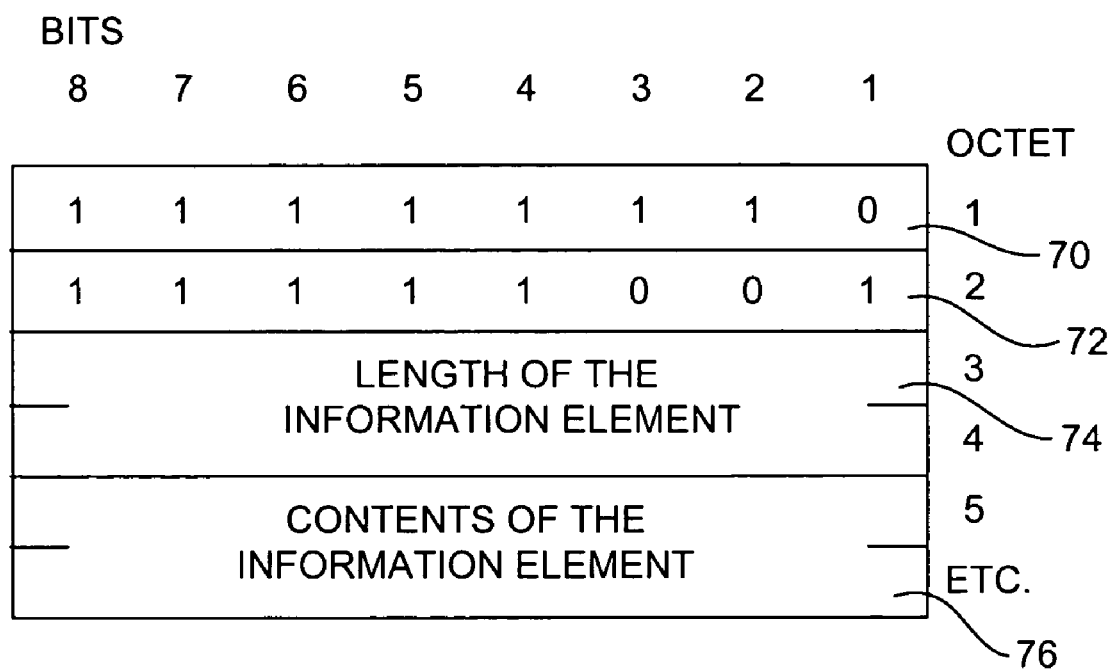
FIG. 9 shown an exemplary format for implementing the debug IE.

An exemplary format for implementing the debug IE of the present invention is shown in FIG. 9. The format includes an 8-bit header 70, an 8-bit protocol field 72, a length of the IE field 74, and a variable-length field 76 in which the contents of the IE are held. In octet 2, bits 7 and 6 are assigned a value of "1 1" to identify that this IE corresponds to the ATM forum specifications. Bit 5 is set to "1" to indicate that explicit instructions are to be followed. Bit 4 is set to "1" to indicate a pass along request. Bits 3-1 are set to "0 0 1" to indicate to discard the IE and proceed. Under this exemplary format, the IE information is encoded such that switching devices that receive the IE and understand the requested action will execute the action, while switching devices that do not understand the action will simply ignore the action and pass the IE along to subsequent switching devices along the connection path.

Figure 10:
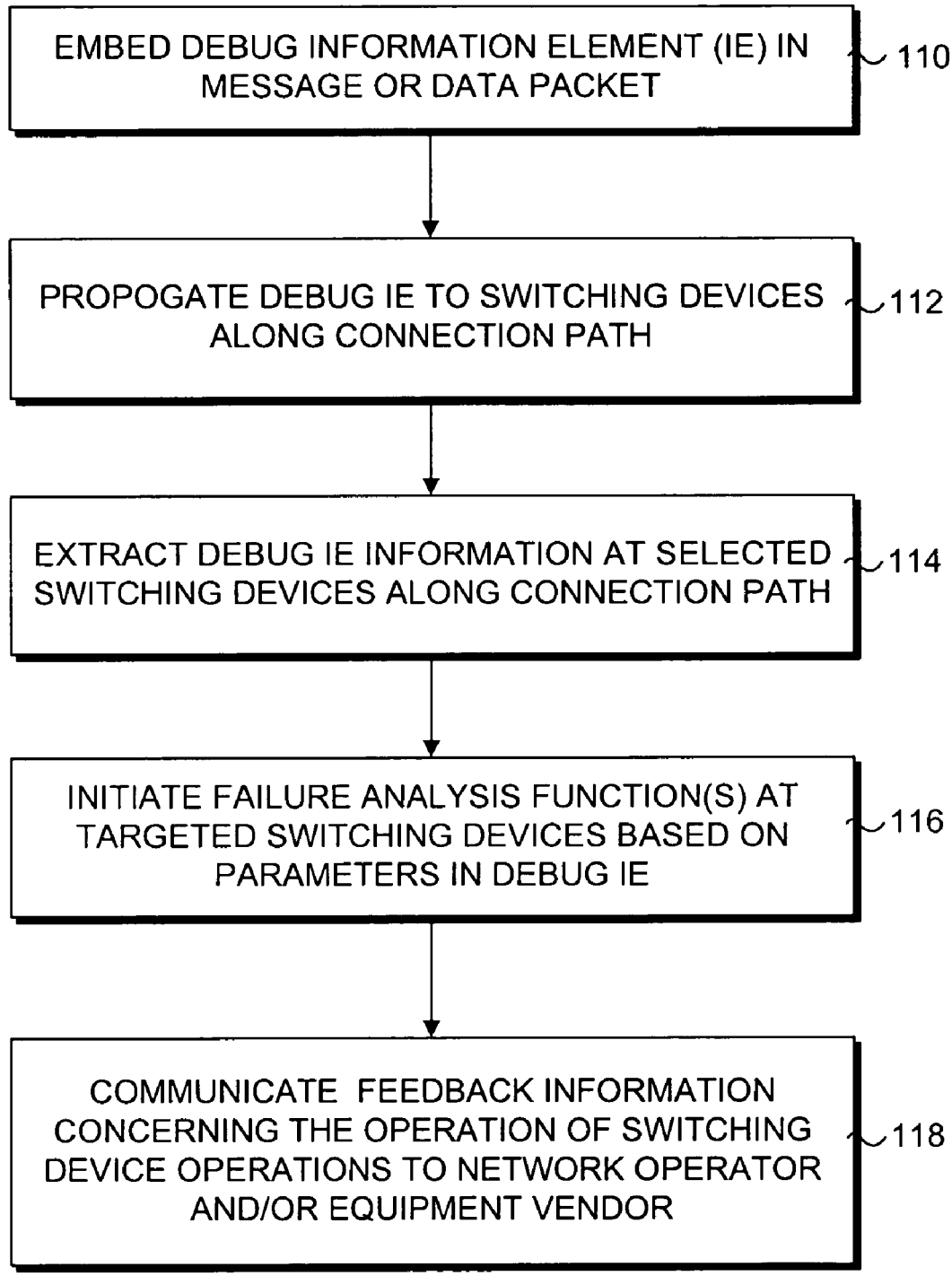
FIG. 10 is a flowchart illustrating the logic used by an exemplary embodiment of the present invention when diagonosing failure points in a PNNI network.

The logic for implementing one embodiment of the invention is shown in FIG. 10. The process starts in a block 110, in which a debug IE is embedded in a data packet, such as a connection-management message. Preferably, the debug IE will be formatted in accord with the format of FIG. 9, although other formats may be used as well, The contents of the IE may comprise only a few bits, or may comprise several bits or bytes of data, depending on the type and identification of the switching devices that are desired to be diagnosed. For instance, the IE content field may contain information that instructs each switching device supplied by a particular vendor (or multiple vendors if a common multi-vendor scheme is adapted) to activate its diagnostic functions, or a particular diagnostic function. In other embodiments, the debug IE could include information identifying switching equipment within a selected peer group(s) to debug, or along a particular path segment(s) to debug, as explained below.

Next, in accord with a block 112, the debug IE is propagated along with the message or data packet to each switching device along the connection path. Upon receiving a message, each switching device will parse the packet to identify the activity that is to be performed on the packet. In general, the activity will simply be to pass the data packet onto the next switching device. However, as provided by a block 114, selected switching devices, such as those supplied by a particular vendor or supplied by members of a vendor cooperative, will be programmed such that they will extract the debug IE and understand what activities they are to perform based on information encoded within the debug IE. Accordingly, the debug IE should be located in the header or encoded in a manner such that it would simply be ignored by equipment produced by other vendors.

Upon extracting the debug IE, failure analysis function(s) corresponding to information contained in the contents of the debug IE would be initiated at selected switching devices, as provided by a block 116. For example, the debug IE might inform a particular switching device to perform a full set of failure analysis functions, or prescribe only (a) particular function(s) to be run.

Upon completion of the failure analysis functions, the switching devices would then communicate the results back to the network operator and/or vendor by either propagating data back along the connection path to the operator or vendor, or providing such information to one or more data stations, as indicated by a block 116. An exemplary scenario corresponding to the latter case is shown in FIG. 6, wherein each switching device corresponding to a particular vendor "C" is connected in communication to a data station 20 via a communications path 22. In an alternative configuration, shown in the bolded communications paths 24, data station 20 could be connected to selected nodes for the vendor or vendor-cooperative, such as one node for each peer group, whereby switching equipment operations data would be passed from the non-connected nodes (i.e, those nodes not directly connected to data station 20) to the connected nodes, which would then forward the data to data station 20.

The foregoing process can be initiated in several different ways. Under many circumstances, it may be desired to determine why a particular connection path failed. For example, suppose a particular connection failed. The first step would be to determine the connection path and the switching device corresponding to the failure point. The debug IE would then be forwarded by the switching devices along the path until it reached the switching device that caused the failure. Upon receiving the debug IE, the failed switching device would be instructed to perform one or more failure analysis functions, and the results of the functions would then be forwarded to the operator of the device.

The debug IE could also be used for maintainence purposes. For instance, a vendor could send a message containing the debug IE to a predetermined set of switching devices to have them perform certain diagnostic functions on a periodic basis. Other similar uses for the debug IE will be known to those skilled in the art.

In the foregoing specification, the invention has been described with reference to specific exemplary embodiments. It will, however, be evident that various modifications and changes may be made thereto without departing from the broader spirit and scope of the invention as set forth in the following claims. The specification and drawings are, accordingly, to be regarded in an illustrative rather than a restrictive sense.

What is claimed is:

1. A method for diagnosing a failure in a network switching device comprising:
   receiving a data packet containing a debug information element (IE) at the network switching device;
   extracting the debug IE from the data packet;
   performing at least one diagnostic function on the network switching device in response to information contained in the debug IE, wherein the debug IE is formatted so as to be propagated transparently across network switching devices that are not configured to recognize the debug IE.

2. The method of claim 1, further comprising communicating results of said at least one diagnostic function from the network switching device to a selected end point connected to the network switching device via a communications link.

3. The method of claim 1, wherein the debug IE is embedded in a connection-management message.

4. The method of claim 1, wherein the debug IE is formatted so as to be propagated transparently across network switching devices that are not configured to recognize the debug IE.

5. The method of claim 1, wherein the debug IE includes information identifying said at least one failure diagnostic function.

6. A method for diagnosing a failure in a network switching device comprising:
   embedding a debug information element (IE) in a message;
   receiving results of at least one failure diagnostic function from a network switching device configured to respond to the debug IE,
   wherein the debug IE is formatted so as to be propagated transparently across network switching devices that are not configured to recognize the debug IE.

7. The method of claim 6, wherein the debug IE is embedded in a connection-management message.

8. The method of claim 6, wherein the debug IE includes information specifying a network switching device on which the failure diagnostic function is performed.

9. A method for diagnosing a failure in a connection path comprising a plurality of nodes in a communication network, comprising:
   embedding a debug information element (IE) in a data packet;
   propagating the data packet to a plurality of switching devices corresponding to respective nodes along the connection path;
   extracting the debug IE at selected switching devices among said plurality of switching devices; and
   performing at least one failure diagnostic function on targeted switching devices among said selected switching devices in response to information contained in the debug IE, wherein the debug IE is formatted so as to be propagated transparently across network switching devices that are not configured to recognize the debug IE.

10. The method of claim 9, wherein the debug IE is embedded in a connection-management message.

11. The method of claim 9, wherein the network comprises a plurality of Asynchronous Transfer Mode (ATM) switching devices.

12. The method of claim 9, wherein the debug IE includes information specifying the targeted switching devices.

13. The method of claim 9, wherein the debug IE includes information identifying said at least one failure analysis function to be performed.

14. The method of claim 9, wherein the selected switching devices correspond to switching devices supplied by a particular vendor.

15. The method of claim 14, wherein the debug IE is encoded in the data packet such that it is passed along or dropped by switching devices at the nodes of the connection path that are not supplied by the particular vendor.

16. The method of claim 9, further comprising communicating results of said at least one failure diagnostic function from the targeted switching devices to an operator of the targeted switching devices or the communication network.

17. The method of claim 16, wherein the results from said at least one failure diagnostic function are communicated to the operator of said targeted switching devices by passing the results to a data station.

18. The method of claim 17, wherein the results are passed to the data station via at least one communication link that connects at least one of the targeted switching devices to the data station.

19. The method of claim 17, wherein the results are passed to the data station by passing information from at least one of the targeted switching devices to another switching device along the connection path, said another switching device passing the results to the data station.

20. The method of claim 9, wherein said targeted switching devices comprise switching devices along a specific portion of the connection path.

21. The method of claim 9, wherein said targeted switching devices comprise switching devices that are members of a logical peer group in an ATM hierarchy.

22. The method of claim 9, wherein the network comprises a PNNI (Private Network-Network Interface) network.

23. The method of claim 9, further comprising:
identifying said plurality of switching devices comprising the connection path;
identifying a switching device along the connection path corresponding to a failure point in the connection path;
forwarding the data packet from switching device to switching device along the connection path until it reaches the switching device corresponding to the failure point; and
encoding the debug IE so as to instruct the switching device corresponding to the failure point to perform at least one failure diagnostic functions to identify why the switching device failed.

24. An article of manufacture comprising a computer-readable medium having computer-executable instructions for performing the functions of:
receiving a data packet containing a debug information element (IE);
extracting the debug IE from the data packet;
performing at least one diagnostic function on a network switching device in response to information contained in the debug IE, wherein the debug IE is formatted so as to be propagated transparently across network switching devices that are not configured to recognize the debug IE.

25. The article of manufacture of claim 24 wherein the computer-executable instructions further perform the function of communicating results of said at least one diagnostic function from the network switching device to a selected end point connected to the network switching device via a communications link.

26. An article of manufacture comprising a computer-readable medium having computer-executable instructions for performing the functions of:
generating a debug information element (IE) having a format so that it is propagated transparently across a network of switching devices that are not configured to recognize the debug IE;
embedding the debug IE in a message; and
receiving results of at least one failure diagnostic function from a network switching device configured to respond to the debug IE.

27. The article of manufacture of claim 26, wherein the debug IE is embedded in a connection-management message.

28. The article of manufacture of claim 26, wherein the debug IE includes information specifying a network switching device on which the at least one failure diagnostic function is performed.

* * * * *